(12) United States Patent
Terry et al.

(10) Patent No.: US 10,958,385 B2
(45) Date of Patent: Mar. 23, 2021

(54) METHOD AND SYSTEM FOR SUPPORTING MULTIPLE HYBRID AUTOMATIC REPEAT REQUEST PROCESSES PER TRANSMISSION TIME INTERVAL

(71) Applicant: InterDigital Technology Corporation, Wilmington, DE (US)

(72) Inventors: Stephen E. Terry, Northport, NY (US); Robert L. Olesen, Huntington, NY (US); Jin Wang, Princeton, NJ (US); Arty Chandra, Roslyn, NY (US)

(73) Assignee: INTERDIGITAL TECHNOLOGY CORPORATION, Wilmington, DE (US)

( * ) Notice: Subject to any disclaimer, the term of this patent is extended or adjusted under 35 U.S.C. 154(b) by 0 days.

(21) Appl. No.: 16/291,957

(22) Filed: Mar. 4, 2019

(65) Prior Publication Data

US 2019/0305896 A1 Oct. 3, 2019

Related U.S. Application Data

(63) Continuation of application No. 15/439,653, filed on Feb. 22, 2017, now Pat. No. 10,225,049, which is a
(Continued)

(51) Int. Cl.
*H04L 1/18* (2006.01)
*H04L 1/16* (2006.01)
(Continued)

(52) U.S. Cl.
CPC .......... *H04L 1/1861* (2013.01); *H04B 7/0413* (2013.01); *H04B 7/0632* (2013.01);
(Continued)

(58) Field of Classification Search
CPC ... H04L 1/1607; H04L 5/0055; H04L 1/1887; H04L 1/1812; H04W 72/042
See application file for complete search history.

(56) References Cited

U.S. PATENT DOCUMENTS 6,021,124 A 2/2000 Haartsen
6,421,803 B1 7/2002 Persson et al.
(Continued)

FOREIGN PATENT DOCUMENTS

CN 1464677 12/2003
CN 1731771 2/2006
(Continued)

OTHER PUBLICATIONS

Ancheta et al., "Software-Based Error Control for Personal Systems Communications Links," IBM Technical Disclosure Bulletin, vol. 30, No. 11, pp. 166-171, TDB-ACC-NO: NN8804166 (Apr. 1988).
(Continued)

*Primary Examiner* — Guy J Lamarre
(74) *Attorney, Agent, or Firm* — Volpe Koenig

(57) ABSTRACT

A method and apparatus may be used for supporting multiple hybrid automatic repeat request (H-ARQ) processes per transmission time interval (TTI). A transmitter and a receiver may include a plurality of H-ARQ processes. Each H-ARQ process may transmit and receive one TB per TTI. The transmitter may generate a plurality of TBs and assign each TB to a H-ARQ process. The transmitter may send control information for each TB, which may include H-ARQ information associated TBs with the TBs. The transmitter may send the TBs using the associated H-ARQ processes simultaneously per TTI. After receiving the TBs, the receiver may send feedback for each of the H-ARQ processes and associated TBs indicating successful or unsuccessful receipt of each of the TBs to the transmitter. The feedback for multiple
(Continued)

TBs may be combined for the simultaneously transmitted H-ARQ processes, (i.e., TBs).

18 Claims, 2 Drawing Sheets

Related U.S. Application Data continuation of application No. 15/018,227, filed on Feb. 8, 2016, now Pat. No. 9,893,844, which is a continuation of application No. 14/467,880, filed on Aug. 25, 2014, now Pat. No. 9,258,096, which is a continuation of application No. 14/082,986, filed on Nov. 18, 2013, now Pat. No. 8,819,514, which is a continuation of application No. 13/735,515, filed on Jan. 7, 2013, now Pat. No. 8,589,753, which is a continuation of application No. 13/309,713, filed on Dec. 2, 2011, now Pat. No. 8,352,824, which is a continuation of application No. 11/670,202, filed on Feb. 1, 2007, now Pat. No. 8,074,137.

(60) Provisional application No. 60/839,462, filed on Aug. 23, 2006, provisional application No. 60/765,076, filed on Feb. 3, 2006.

(51) Int. Cl.
| | | |
|---|---|---|
| H04L 5/00 | (2006.01) | |
| H04B 7/0413 | (2017.01) | |
| H04B 7/06 | (2006.01) | |
| H04W 88/08 | (2009.01) | |
| H04W 72/04 | (2009.01) | |

(52) U.S. Cl.
CPC .......... *H04L 1/1607* (2013.01); *H04L 1/1812* (2013.01); *H04L 1/1887* (2013.01); *H04L 5/0053* (2013.01); *H04L 5/0055* (2013.01); *H04L 5/0057* (2013.01); *H04W 72/042* (2013.01); *H04W 72/0406* (2013.01); *H04W 72/0446* (2013.01); *H04W 88/08* (2013.01)

(56) References Cited

U.S. PATENT DOCUMENTS

| | | | |
|---|---|---|---|
| 6,658,005 B2 | 12/2003 | Seidel et al. | |
| 6,956,855 B1 | 10/2005 | Chang | |
| 6,977,888 B1 | 12/2005 | Frenger et al. | |
| 7,075,917 B2 | 7/2006 | Herrmann | |
| 7,263,088 B2 | 8/2007 | Bui | |
| 7,287,206 B2 | 10/2007 | Terry et al. | |
| 7,379,746 B2 | 5/2008 | Lee et al. | |
| 7,392,460 B2 | 6/2008 | Kim et al. | |
| 7,447,968 B2 | 11/2008 | Ha et al. | |
| 7,508,804 B2 | 3/2009 | Das et al. | |
| 7,512,409 B1 * | 3/2009 | Hadad | H04L 5/023 455/3.01 |
| 7,590,181 B2 | 9/2009 | Awad et al. | |
| 7,640,486 B2 | 12/2009 | Dottling et al. | |
| 7,660,367 B2 | 2/2010 | Nishio et al. | |
| 7,693,125 B2 | 4/2010 | Ihm et al. | |
| 7,733,846 B2 | 6/2010 | Liu | |
| 7,924,785 B2 | 4/2011 | Shaheen et al. | |
| 8,074,137 B2 | 12/2011 | Terry et al. | |
| 8,270,345 B2 | 9/2012 | Franceschini et al. | |
| 8,570,952 B2 | 10/2013 | Terry et al. | |
| 9,402,248 B2 | 7/2016 | Papasakellariou | |
| 2002/0159431 A1 | 10/2002 | Moulsley et al. | |
| 2003/0074476 A1 | 4/2003 | Kim et al. | |
| 2003/0086391 A1 | 5/2003 | Terry et al. | |
| 2003/0147371 A1 | 8/2003 | Choi et al. | |
| 2003/0152062 A1 | 8/2003 | Terry et al. | |
| 2003/0153276 A1 | 8/2003 | Terry et al. | |
| 2004/0009786 A1 | 1/2004 | Terry | |
| 2004/0037224 A1 | 2/2004 | Choi et al. | |
| 2004/0152458 A1 | 8/2004 | Hottinen | |
| 2004/0185785 A1 | 9/2004 | Mir et al. | |
| 2004/0190523 A1 | 9/2004 | Gessner et al. | |
| 2004/0199846 A1 | 10/2004 | Matsumoto et al. | |
| 2004/0249917 A1 | 12/2004 | Lin | |
| 2005/0063345 A1 | 3/2005 | Wu et al. | |
| 2005/0063347 A1 | 3/2005 | Sarkkinen et al. | |
| 2005/0088358 A1 | 4/2005 | Larry et al. | |
| 2005/0105494 A1 | 5/2005 | Kim et al. | |
| 2005/0128993 A1 | 6/2005 | Yu et al. | |
| 2005/0152310 A1 * | 7/2005 | Rudolf | H04L 5/14 370/329 |
| 2005/0180449 A1 | 8/2005 | Ranta-Aho et al. | |
| 2005/0219999 A1 | 10/2005 | Kim et al. | |
| 2005/0250540 A1 | 11/2005 | Ishii et al. | |
| 2005/0276266 A1 | 12/2005 | Terry | |
| 2006/0007886 A1 | 1/2006 | Lee et al. | |
| 2006/0007887 A1 | 1/2006 | Kwon et al. | |
| 2006/0013161 A1 | 1/2006 | Suzuki | |
| 2006/0034240 A1 | 2/2006 | Kwak et al. | |
| 2006/0092972 A1 | 5/2006 | Petrovic et al. | |
| 2006/0092973 A1 * | 5/2006 | Petrovic | H04L 1/1887 370/469 |
| 2006/0128309 A1 | 6/2006 | Dateki et al. | |
| 2006/0182065 A1 | 8/2006 | Petrovic et al. | |
| 2006/0209813 A1 | 9/2006 | Higuchi et al. | |
| 2006/0245384 A1 * | 11/2006 | Talukdar | H04L 1/1874 370/310 |
| 2007/0049308 A1 | 3/2007 | Lindoff et al. | |
| 2007/0110104 A1 | 5/2007 | Sartori et al. | |
| 2007/0133449 A1 | 6/2007 | Schacht et al. | |
| 2007/0255993 A1 | 11/2007 | Yap et al. | |

FOREIGN PATENT DOCUMENTS

| | | |
|---|---|---|
| EP | 1 286 491 | 2/2003 |
| EP | 1 389 848 | 2/2004 |
| JP | 09-247132 | 9/1997 |
| WO | 03/036844 | 5/2003 |
| WO | 03/069818 | 8/2003 |
| WO | 03/094554 | 11/2003 |
| WO | 03/096600 | 11/2003 |
| WO | 04/015906 | 2/2004 |
| WO | 04/102863 | 11/2004 |
| WO | 05/018241 | 2/2005 |
| WO | 05/109729 | 11/2005 |
| WO | 05/112327 | 11/2005 |
| WO | 05/112331 | 11/2005 |

OTHER PUBLICATIONS

Aniba et al., "Adaptive Proportional Fairness for Packet Scheduling in HSDPA", Global Telecommunications Conference, 2004, GLOBECOM, vol. 6, pp. 4033-4037, (Nov. 29-Dec. 3, 2004).

Das et al., "Evolution of UTMS Toward High-Speed Downlink Packet Access", Bell Labs Technical Journal, vol. 7, No. 7, pp. 47-68, (Mar. 4, 2003).

Ericsson et al., "Revised Text Proposal on Multiplexing Method of L1/L2 Control Signaling in Uplink Single-Carrier FDMA Radio Access," TSG-RAN WG1 #43, R1-051570, Seoul, Korea (Nov. 7-11, 2005).

Ericsson et al., "Revised Text Proposal on Multiplexing Method of L1/L2 Control Signaling in Uplink Single-Carrier FDMA Radio Access," TSG-RAN WG1 #43, R1-051306, Seoul, Kroea (Nov. 7-11, 2005).

Ericsson et al., Text Proposal on Adaptive Modulation and Channel Coding Rate Control for Frequency Domain Scheduling in Evolved UTRA Downlink, TSG-RAN WG1 #43, R1-051307, (Seoul, Korea Nov. 7-11, 2005).

Forket et al., High Speed Downlink Packet Access (HSDPA)—Enhanced Data Rates for UMTS Evolution, Computer Networks, Elsevier Science Publisher B.V., vol. 49, No. 3, pp. 325-340, (Oct. 19, 2005).

(56) References Cited

OTHER PUBLICATIONS

Huawei, "Further considerations on multiplexing method of shared Control Channel in Uplink Single-Carrier FDMA," TSG-RAN WG1 #43, R1-051430, Seoul, Korea (Nov. 7-11, 2005).
IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1, IEEE Std. 802.16e-2005 (Feb. 2006).
Lucent Technologies, "L2/L3 MIMO Aspects," TSG-RAN Working Group 2 Meeting #43, R2-041550 (Aug. 16-20, 2004).
Lucent Technologies, "Signalling Support for Multiple Simultaneous Transmissions to a UE within a TTI," TSG-RAN WG1 and WG2 Adhoc on HSDPA, 12A010055 (Nov. 5-7, 2001).
Lundevall et al., "Streaming Applications Over HSDPA in Mixed Service Scenarios", 2004 IEEE 60$^{th}$ Vehicular Technology Conference, 2004. VTC2004-Fall., vol. 2, pp. 841-845, (Sep. 26-29, 2004).
Motorola, "E-UTRA Downlink Control Channel Design and TP," 3GPP TSG RAN1#43, R1-051331, Seoul, Korea (Nov. 7-11, 2005).
Nokia, "OFDMA Downlink L1/L2 control signaling—text proposal," 3GPP TSG RAN WG1 LTE Ad Hoc Meeting, R1-060186, Helsinki, Finland (Jan. 23-25, 2006).
Nortel Networks, "Discussion on ARQ aspects for High Speed Downlink Packet Access," TSG-RAN Working Group1 meeting #17, TSGR1#17(00)1442 (Nov. 21-24, 2000).
Phillips, "HS-SCCH signalling for REL-7 FDD MIMO scheme," 3GPP TSG RAN WG1 Meeting #46, R1-061953, Tallinn, Estonia (Aug. 28-Sep. 1, 2006).
Samsung, "Data and Control Multiplexing in DFT-S-OFDM," 3GPP TSG RAN WG1 Meeting #42bis, R1-051039, San Diego, USA (Oct. 10-14, 2005).
Samsung, "Downlink Pilot and Control Channel Structure for EUTRA," 3GPP TSG RAN WG1 Meeting #43, R1-051344, Seoul, Korea (Nov. 7-11, 2005).
Siemens, "Downlink scheduling," 3GPP TSG RAN WG1 LTE Ad-Hoc, R1-060215, Helsinki, Finland (Jan. 23-25, 2006).
Siemens, "Signaling methods for Hybrid ARQ Type II/III," 3GPP TSG RAN WG1 #12, R1-00/0514 (Apr. 10-13, 2000).
Texas Instruments, "Multiplexing of UE Identities in the Shared Control Channel of EUTRA Downlink," 3GPP TSG RAN WG1 Ad Hoc on LTE, R1-060064, Helshinki, EU (Jan. 23-25, 2006).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 26.200 V0.4.0 (Jan. 2007).
Third Generation Partnership Project, "Technical Specification Group Radio Access Network; Physical Channels and Modulation (Release 8)," 3GPP TS 26.211 V0.2.2 (Dec. 2006).
Third Generation Partnership Project, "Technical Specification Group Radio Access Network; Physical layer procedures (Release 8)," 3GPP TS 36.213 V0.2.0 (Oct. 2006).
Third Generation Partnership Project, "Technical Specification Group Radio Access Network; Multiplexing and channel coding (Release 8)," 3GPP TS 36.212 V0.2.1 (Nov. 2006).
Third Generation Partnership Project, "Technical Specification Group Radio Access Network; Multiplexing and channel coding (FDD) (Release 7)," 3GPP TS 25.212 V7.3.0 (Dec. 2006).
Third Generation Partnership Project, "Technical Specification Group Radio Access Network; Multiplexing and channel coding (FDD) (Release 6)," 3GPP TS 25.212 V6.10.0 (Dec. 2006).
Third Generation Partnership Project, "Technical Specification Group Radio Access Network; Multiplexing and channel coding (FDD) (Release 6)," 3GPP TS 25.212 V6.7.0 (Dec. 2005).
Third Generation Partnership Project, "Technical Specification Group Radio Access Network; Multiplexing and channel coding (FDD) (Release 5)," 3GPP TS 25.212 V5.10.0 (Jun. 2005).
Third Generation Partnership Project, "Technical Specification Group Radio Access Network; High Speed Downlink Packet Access (HSDPA); Overall description; Stage 2 (Release 7)," 3GPP TS 25.308 V7.1.0 (Dev. 2006).
Third Generation Partnership Project, "Technical Specification Group Radio Access Network; High Speed Downlink Packet Access (HSDPA); Overall description; Stage 2 (Release 6)," 3GPP TS 25.308 V6.3.0 (Dec. 2004).
Third Generation Partnership Project, "Technical Specification Group Radio Access Network; High Speed Downlink Packet Access (HSDPA); Overall description; Stage 2 (Release 5)," 3GPP TS 25.308 V5.7.0 Dec. 2004).
Third Generation Partnership Project, "Technical Specification Group Radio Access Network; Physical layer procedures (FDD) (Release 7)," 3GPP TS 25.214 V7.3.0 (Dec. 2006).
Third Generation Partnership Project, "Technical Specification Group Radio Access Network; Physical layer procedures (FDD) (Release 6)," 3GPP TS 25.214 V6.11.0 (Dec. 2006).
Third Generation Partnership Project, "Technical Specification Group Radio Access Network; Physical layer procedures (FDD) (Release 6)," 3GPP 25.214 V6.7.1 (Dec. 2005).
Third Generation Partnership Project, "Technical Specification Group Radio Access Network; Physical layer procedures (FDD) (Release 5)," 3GPP TS 25.214 V5.11.0 (Jun. 2005).
Third Generation Partnership Project, "Technical Specification Group Radio Access Network; Medium Access Control (MAC) protocol specification (Release 7)," 3GPP TS 25.321 V7.3.0 (Dec. 2006).
Third Generation Partnership Project, "Technical Specification Group Radio Access Network; Medium Access Control (MAC) protocol specification (Release 6)," 3GPP TS 25.321 V6.11.0 (Dec. 2006).
Third Generation Partnership Project, "Technical Specification Group Radio Access Network; Medium Access Control (MAC) protocol specification (Release 5)," 3GPP TS 25.321 V5.12.0 (Sep. 2005).
Third Generation Partnership Project, "Technical Specification Group Radio Access Network; Medium Access Control (MAC) protocol specificatino (Release 6)," 3GPP TS 25.321 V6.7.0 (Dec. 2005).
Third Generation Partnership Project, "Technical Specification Group Radio Access Network; MAC protocol specification (Release 5)," 3GPP TS 25.321 V5.0.0 (Mar. 2002).
Third Generation Partnership Project, "Technical Specification Group Radio Access Network; Physical Layer Aspects for Evolved UTRA (Release 7)," 3GPP TR 25.814 V1.0.1 (Nov. 2005).
Third Generation Partnership Project, "Technical Specification Group Radio Access Network; Physical layer aspects for evolved Universal Terrestrial Radio Access (UTRA) (Release 7)," 3GPP TR 25.814 V7.1.0 (Sep. 2006).
Third Generation Partnership Project, "Technical Specification Group Radio Access Network; Multiplexing and channel coding (FDD) (Release 6)," 3GPP TS 25.512 V6.2.0 (Jun. 2004).
Third Generation Partnership Project, "Technical Specification Group Radio Access Network; Physical layer aspects for evolved Universal Terrestrial Radio Access (UTRA) (Release 7)" 3GPP TR 25.814 V1.2.1 (Mar. 2006).
Zheng et al., Multiple ARQ Processes for MIMO Systems, EURASIP Journal on Applied Signal Processing, vol. 5, pp. 772-782, XP002347853, (May 2004).

\* cited by examiner

METHOD AND SYSTEM FOR SUPPORTING MULTIPLE HYBRID AUTOMATIC REPEAT REQUEST PROCESSES PER TRANSMISSION TIME INTERVAL

CROSS REFERENCE TO RELATED APPLICATIONS

This application is a continuation of U.S. patent application Ser. No. 15/439,653, filed Feb. 22, 2017, which issues on Mar. 5, 2019 as U.S. Pat. No. 10,225,049, which is a continuation of U.S. patent application Ser. No. 15/018,227, filed Feb. 8, 2016, which issued on Feb. 13, 2018 as U.S. Pat. No. 9,893,844, which is a continuation of U.S. patent application Ser. No. 14/467,880, filed Aug. 25, 2014, which issued on Feb. 9, 2016 as U.S. Pat. No. 9,258,096, which is a continuation of U.S. patent application Ser. No. 14/082,986, filed Nov. 18, 2013, which issued on Aug. 26, 2014 as U.S. Pat. No. 8,819,514, which is a continuation of U.S. patent application Ser. No. 13/735,515, filed Jan. 7, 2013, which issued on Nov. 19, 2013 as U.S. Pat. No. 8,589,753, which is a continuation of U.S. patent application Ser. No. 13/309,713, filed Dec. 2, 2011, which issued on Jan. 8, 2013 as U.S. Pat. No. 8,352,824, which is a continuation of U.S. patent application Ser. No. 11/670,202, filed Feb. 1, 2007, which issued on Dec. 6, 2011 as U.S. Pat. No. 8,074,137, which claims the benefit of U.S. Provisional Application Nos. 60/839,462 filed Aug. 23, 2006 and 60/765,076 filed Feb. 3, 2006, the contents of which are hereby incorporated by reference.

FIELD OF INVENTION

The present invention is related to wireless communication systems. More particularly, the present invention is related to a method and system for supporting multiple hybrid automatic repeat request (H-ARQ) processes per transmission time interval (TTI).

BACKGROUND

The third generation partnership project (3GPP) is currently considering a long term evolution (LTE) of the 3GPP to provide a new radio access network for a high-data-rate, low-latency, packet-optimized, improved system with high capacity and better coverage. The LTE is an evolution of the radio interface, (i.e., evolved universal terrestrial radio access (UTRA)), and the radio network architecture, (i.e., evolved universal terrestrial radio access network (UTRAN)). Currently, orthogonal frequency division multiple access (OFDMA) and single carrier frequency division multiple access (SC-FDMA) are proposed as air interface technologies to be used in the downlink and uplink transmissions respectively.

Meanwhile, 3GPP high speed packet access evolution (HSPA+) is also being proposed to improve the 3GPP radio access network capacity and coverage. In HSPA+, an evolution of the radio interface and the radio network architecture is being considered. In HSPA+, the air interface technology will still be based on code division multiple access (CDMA), but with a more efficient physical layer architecture including independent channelization codes, (distinguished with respect to channel quality), and multiple-input multiple-output (MIMO).

H-ARQ has been adopted by several wireless communication standards including 3GPP and 3GPP2. Besides the radio link control (RLC) layer's automatic repeat request (ARQ) function, H-ARQ provides improved throughput and performance with respect to link adaptation errors and rate control. Asynchronous H-ARQ is used in high speed downlink packet access (HSDPA) and synchronous H-ARQ is used in high speed uplink packet access (HSUPA).

The conventional H-ARQ scheme is a single H-ARQ scheme in which a transmitter transmits only one transport block (TB) per TTI via one H-ARQ process. With the introduction of physical resource dependent link adaptation mechanism in LTE or HSPA+, the conventional H-ARQ signaling mechanism, (i.e., signaling mechanism for single H-ARQ), is not sufficient for transmitting multiple TBs per TTI via multiple H-ARQ processes.

Therefore, it would be desirable to provide a method and system for supporting multiple H-ARQ processes for transmitting multiple TBs simultaneously per TTI.

SUMMARY

A method and apparatus may be used for supporting multiple H-ARQ processes per TTI. A transmitter and a receiver may include a plurality of H-ARQ processes. Each H-ARQ process may transmit and receive one TB per TTI. The transmitter may generate a plurality of TBs and assign each TB to a H-ARQ process. The transmitter may send control information for each TB, which may include H-ARQ information associated TBs with the TBs. The transmitter may send the TBs using the associated H-ARQ processes simultaneously per TTI. After receiving the TBs, the receiver may send feedback for each of the H-ARQ processes and associated TBs indicating successful or unsuccessful receipt of each of the TBs to the transmitter. The feedback for multiple TBs may be combined for the simultaneously transmitted H-ARQ processes, (i.e., TBs). The control information and the feedback may be sent via a layer 1 control part or layer 2 or layer 3 signaling. When MIMO is implemented, one H-ARQ process may be associated with one MIMO stream, or codeword. The feedback may include a channel quality indicator (CQI) per MIMO stream or codeword.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

The present invention is applicable to any wireless communication system including, but not limited to, LTE and HSPA+ of the 3GPP standard.

Figure 1:
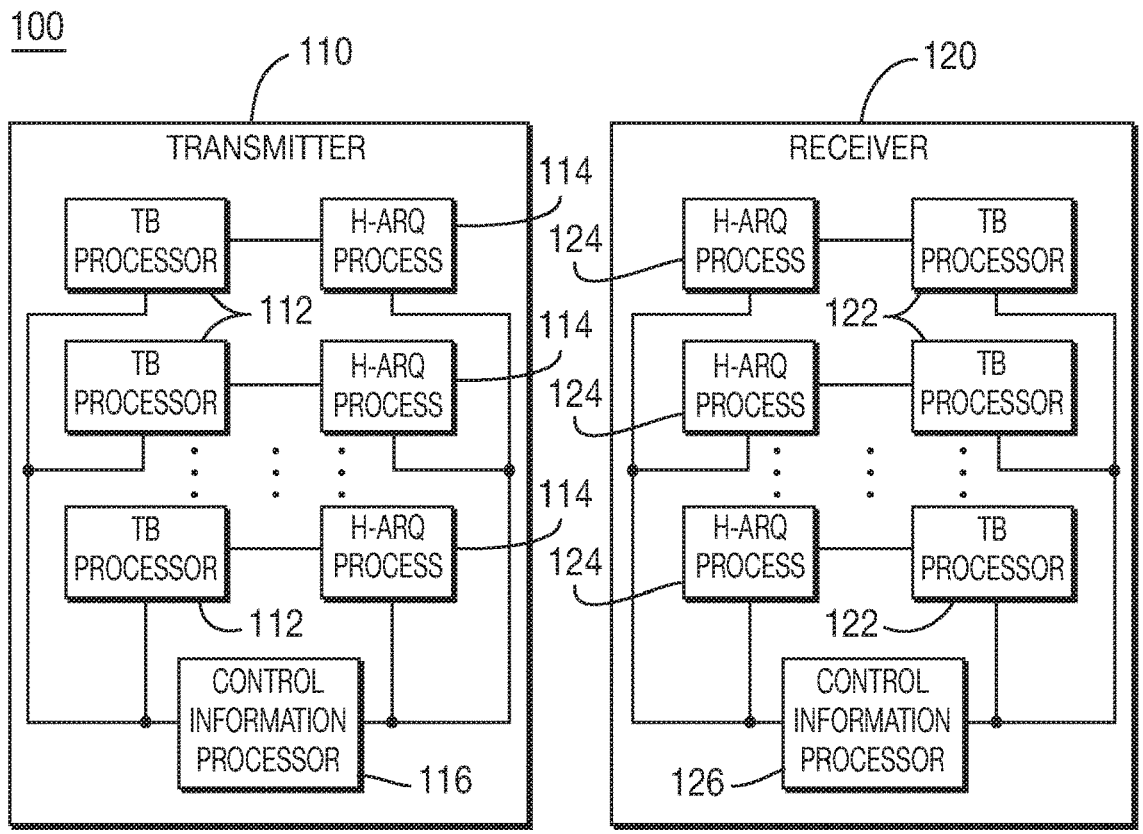
FIG. 1 is a block diagram of a system supporting multiple H-ARQ processes per TTI in accordance with the present invention.

FIG. 1 is a block diagram of a system 100 in accordance with the present invention. The system 100 includes a transmitter 110 and a receiver 120. The transmitter 110 and the receiver 120 may be a wireless transmit/receive unit (WTRU) and a Node-B, or vice versa. The terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. The terminology "base station" includes but is not limited to a Node-B, a site controller, an access point (AP), or any other type of interfacing device capable of operating in a wireless environment.

The transmitter 110 includes a plurality of TB processors 112, a plurality of H-ARQ processes 114 and a control information processor 116. Each TB processor 112 receives at least one data flow, (for example, at least one flow of medium access control (MAC) or RLC packet data units (PDUs)), and generates at least one TB. Multiple MAC or RLC PDUs may be multiplexed into one TB. In accordance with the present invention, multiple TBs may be transmitted simultaneously per TTI using multiple H-ARQ processes. The TB processor 112 selects a proper transport format combination (TFC), (i.e., TB size, TB set size, TTI, modulation and coding scheme (MCS), subcarriers, antenna beams, precoding matrix indication (PMI), cyclic redundancy check (CRC) size, redundancy version (RV), data block to radio resource mapping, or the like), for each of the TBs based on the link condition between the transmitter 110 and the receiver 120. Preferably, a separate CRC is attached to each TB. Multiple TBs are then transmitted simultaneously via multiple H-ARQ processes 114 per TTI.

The transmitter 110 assigns each of the TBs to a particular H-ARQ process and transmits multiple TBs via the assigned H-ARQ processes simultaneously per TTI. For example, when several independent spatial data streams, (i.e., several TBs), are transmitted simultaneously using MIMO, one H-ARQ process may be assigned to each spatial data stream, (i.e., one TB), and the multiple spatial data streams may be transmitted simultaneously via multiple H-ARQ processes.

The control information processor 116 is configured to send control information regarding the TBs and the H-ARQ processes associated with the TBs to the receiver 120 for each TTI. The control information includes, but is not limited to, a transport format and resource indicators (TFRIs) and H-ARQ-related information. The TFRI includes, but is not limited to, information about the dynamic part of the TFC, (including TB set size and modulation and coding scheme) and physical channel information, (i.e., channelization codes, subcarriers and antenna beams onto which the TBs are mapped in the corresponding TTI). The H-ARQ information includes, but is not limited to, an H-ARQ process ID, an H-ARQ function ID and a redundancy version. The control information may include rate matching parameters for each TB. Rate matching parameters for each TB may be derived from the TFRI.

The receiver 120 includes a plurality of TB processors 122, a plurality of H-ARQ processes 124 and a control information processor 126. The control information processor 126 processes control information received from the transmitter 110. Each H-ARQ process 124 processes one TB per TTI so that multiple TBs may be processed simultaneously per TTI based on the control information received from the transmitter 110. The H-ARQ process 124, (or the control information processor 126), sends feedback to the transmitter 110 indicating successful or unsuccessful receipt of each of the TBs, so that the transmitter 110 may retransmit failed TBs based on the feedback. The TB processors 122 process successfully received TBs based on the control information.

The feedback for multiple TBs may be combined for the simultaneous transmission of H-ARQ processes, (i.e., TBs). The control information and the feedback may be sent via a layer 1 control part or layer 2 or layer 3 signaling. When MIMO is implemented, the feedback may include a CQI per MIMO stream, or codeword.

Figure 2:
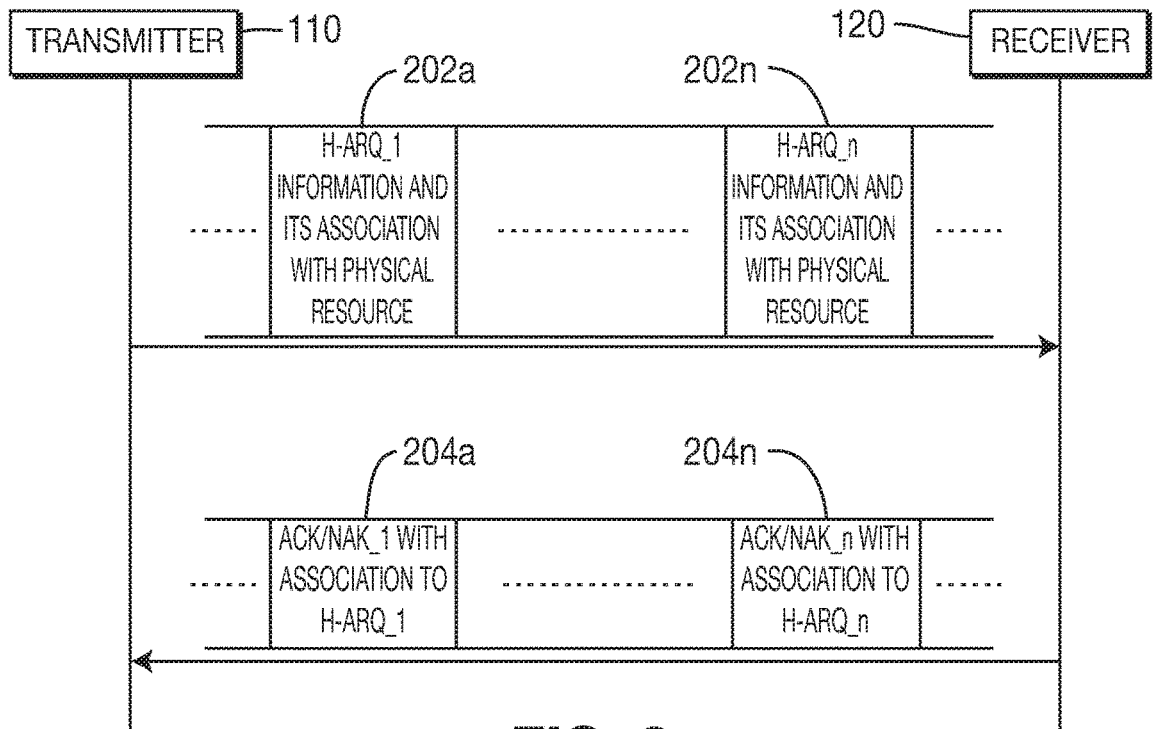
FIG. 2 shows transmission of associated control information for supporting simultaneous multiple H-ARQ processes and transmission of multiple TBs per TTI in accordance with the present invention.

FIG. 2 shows transmission of associated control information for supporting simultaneous multiple H-ARQ processes and transmission of multiple TBs per TTI in accordance with the present invention. The transmitter 110 sends a set of control information 202a-202n for the set of TBs transmitted in a common TTI to the receiver 120. The control information 202a-202n for the simultaneous H-ARQ transmissions may be concatenated into a single packet.

The control information 202a-202n includes information associating each control information 202a-202n with a corresponding TB. In a conventional wireless communication system, (i.e., HSDPA and HSUPA), control information for only one TB is transmitted through a separate control channel per TTI, (i.e., a high speed shared control channel (HS-SCCH) in HSDPA and an enhanced dedicated physical control channel (E-DPCCH) in HSUPA), and since only one TB is transmitted per TTI, there is an implicit association between the transmitted TB and the related control information. However, in accordance with the present invention, since multiple TBs are transmitted simultaneously in one TTI through multiple H-ARQ processes, the control information 202a-202n should include association information relating each control information 202a-202n to its associated TB. With the association information, the receiver 220 unambiguously knows which control information 202a-202n is for which TB so that the receiver 220 can use the right control information 202a-202n for processing of each TB.

Figure 3:
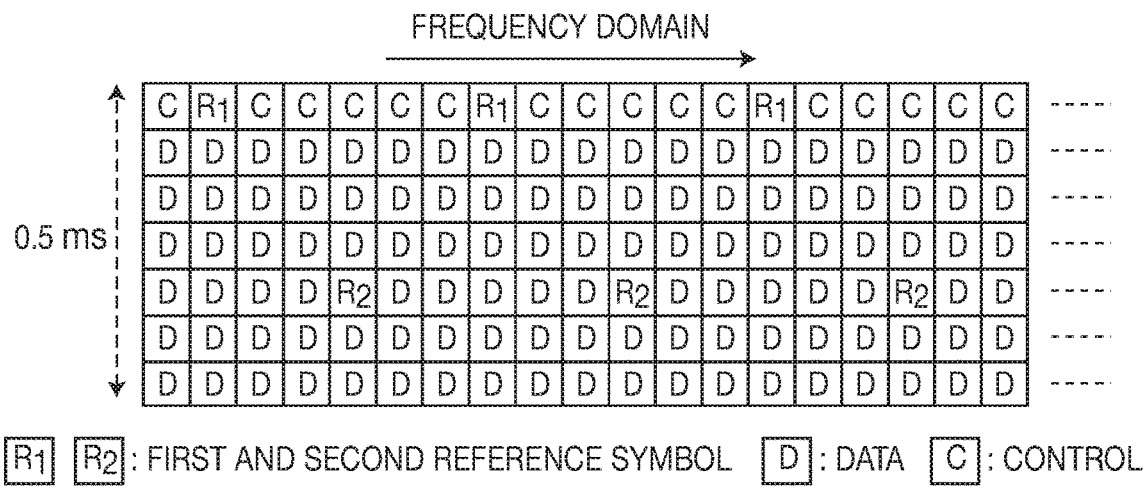
FIG. 3 shows an LTE downlink physical layer frame structure of data and associated control information.

The control information may be transmitted via a layer 1 control part of one TTI or layer 2 or layer 3 signaling. FIG. 3 shows an LTE downlink physical layer subframe 300 for data and associated control information. The subframe 300 includes a data part, (denoted as "D"), and a control part, (denoted as "C"). The control information may be included in the control part of the subframe 300. The downlink layer 1 frame structure for HSPA+ will be based on CDMA technology which may include independent channelization-codes (distinguished with regard to channel quality) and MIMO. With variable TTI, the control part may contain control information for data block mapped onto several subframes. When MIMO is used, the control information may also contain the allocation of spatial streams or codewords of different data blocks mapped to different H-ARQ functions per TTI.

Upon reception of the TBs, the receiver 120 sends separate feedback, (i.e., a positive acknowledgement (ACK) or a negative acknowledgement (NACK)), for each of the TBs. FIG. 2 also shows transmission of feedback 204a-204n for supporting multiple H-ARQ processes per TTI in accordance with the present invention. Since multiple feedback transmission 204a-204n is done for different H-ARQ processes from the receiver 120 to the transmitter 110, the transmitter 110 will know which feedback is for which H-ARQ process, (i.e., TB). For this association, an H-ARQ process ID, (or any other association information), may be included in each feedback 204a-204n to indicate the corresponding H-ARQ process.

Alternatively, if a pre-defined pattern or sequence of TBs associated with H-ARQ processes can be maintained and guaranteed by the transmitter 110 and the receiver 120, the feedback 204a-204n may be sent according to the pre-defined pattern or sequence so that the transmitter 110 knows which feedback corresponds to which H-ARQ process. For example, the feedback may be arranged in either ascending or descending order with respect to H-ARQ IDs associated with the feedback. This may be determined during the call setup. Alternatively, if a TB is successfully received by the receiver 120, the position for that TB's feedback may be filled with a dummy packet with a known pattern so that the transmitter 110 may recognize the successful receipt of the TB when the transmitter 110 decodes the feedback packet.

The feedback 204a-204n may be concatenated into a single packet for multiple H-ARQ processes, (i.e., multiple TBs). The number of feedback, (i.e., the number of ACKs and NACKs), concatenated into a single feedback packet is dependent on the number of H-ARQ processes used for transmission of the TBs. When the number of feedback increases, a more robust MCS, subcarriers, antenna beams, codewords, or higher transmission power may be used for transmission of the concatenated feedback packet. Due to the importance of this feedback packet, a CRC may be attached to the concatenated feedback packet to improve the error detection at the transmitter 110.

Figure 4:
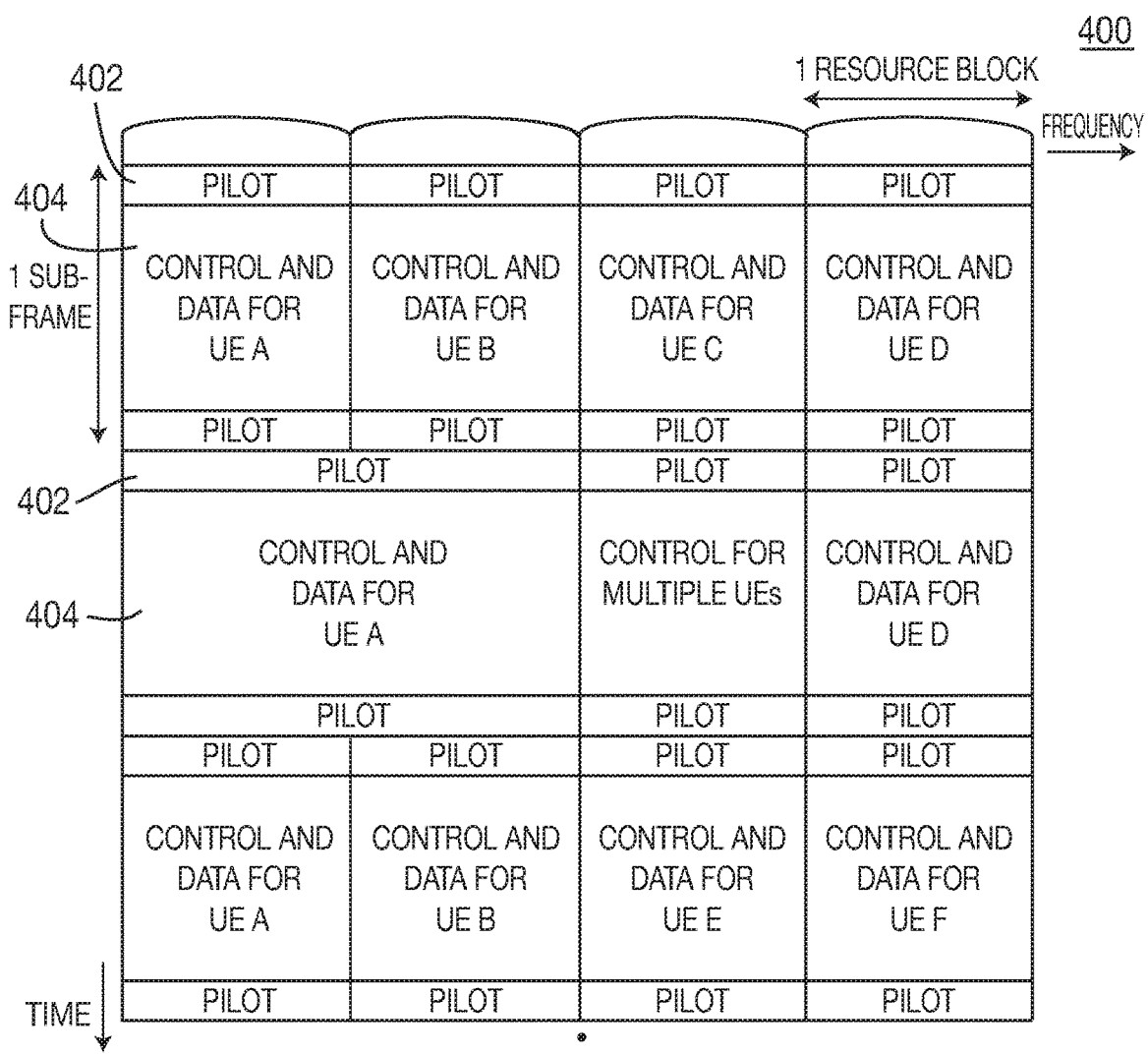
FIG. 4 shows an LTE uplink physical layer frame structure for data and associated control information.

The feedback may be included in the control part of the physical layer frame. FIG. 4 shows an LTE uplink physical layer subframe 400 structure. The subframe 400 includes a pilot part 402 and a control and data part 404. The feedback may be included in the control and data part 404 of the subframe 400.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
a receiver and a processor configured to receive a single downlink control information for a single transport block and a plurality of downlink control information for a plurality of first transport blocks, wherein each of the downlink control information includes a HARQ process identification (ID) associated with a respective transport block and resource mapping information for the respective transport block;
the receiver and the processor are further configured to receive the single transport block in a first time interval or the plurality of transport blocks in a second time interval based on the respective resource mapping information;
the processor is further configured to process the single transport block and the plurality of transport blocks based on the respective HARQ process IDs; and
the processor and a transmitter are configured to transmit on a physical control channel having a first format an ACK/NACK for the single transport block and having a second format a plurality of ACK/NACKs for the plurality of transport blocks; wherein a first format does not include a cyclic redundancy check and the second format includes a cyclic redundancy check.

2. The WTRU of claim 1 wherein the single transport block or the plurality of transport blocks are received over an antenna beam.

3. The WTRU of claim 1 wherein a transmission time of a transport block is variable.

4. The WTRU of claim 1 wherein the transmitted physical control channel of the second format includes channel quality indicators.

5. The WTRU of claim 1 wherein the plurality of ACK/NACKs in the second format are arranged based on information received during call setup.

6. The WTRU of claim 1 wherein the first format and the second format are associated with different transmission powers.

7. A method performed by a wireless transmit receive unit (WTRU), the method comprising:
receiving a single downlink control information for a single transport block and a plurality of downlink control information for a plurality of first transport blocks, wherein each of the downlink control information includes a HARQ process identification (ID) associated with a respective transport block and resource mapping information for the respective transport block;
receiving the single transport block in a first time interval or the plurality of transport blocks in a second time interval based on the respective resource mapping information;
processing the single transport block and the plurality of transport blocks based on the respective HARQ process IDs; and
transmitting on a physical control channel having a first format an ACK/NACK for the single transport block and having a second format a plurality of ACK/NACKs for the plurality of transport blocks; wherein a first format does not include a cyclic redundancy check and the second format includes a cyclic redundancy check.

8. The method of claim 7 wherein the single transport block or the plurality of transport blocks are received over an antenna beam.

9. The method of claim 7 wherein a transmission time of a transport block is variable.

10. The method of claim 7 wherein the transmitted physical control channel of the second format includes channel quality indicators.

11. The method of claim 7 wherein the plurality of ACK/NACKs in the second format are arranged based on information received during call setup.

12. The method of claim 7 wherein the first format and the second format are associated with different transmission powers.

13. A base station comprising:
- a transmitter configured to transmit a single downlink control information for a single transport block and a plurality of downlink control information for a plurality of first transport blocks, wherein each of the downlink control information includes a HARQ process identification (ID) associated with a respective transport block and resource mapping information for the respective transport block;
- the transmitter further configured to transmit the single transport block in a first time interval or the plurality of transport blocks in a second time interval based on the respective resource mapping information; and
- a receiver configured to receive on a physical control channel having a first format an ACK/NACK for the single transport block and having a second format a plurality of ACK/NACKs for the plurality of transport blocks; wherein a first format does not include a cyclic redundancy check and the second format includes a cyclic redundancy check.

14. The base station of claim 13 wherein the single transport block or the plurality of transport blocks are received over an antenna beam.

15. The base station of claim 13 wherein a transmission time of a transport block is variable.

16. The base station of claim 13 wherein the transmitted physical control channel of the second format includes channel quality indicators.

17. The base station of claim 13 wherein the plurality of ACK/NACKs in the second format are arranged based on information received during call setup.

18. The base station of claim 13 wherein the first format and the second format are associated with different transmission powers.

* * * * *